Patented Aug. 6, 1935

2,010,245

UNITED STATES PATENT OFFICE 2,010,245

MAGNETIC BALANCE

Erwin Roux, Berlin-Friedenau, Germany, assignor to Askania-Werke Aktiengesellschaft, Berlin-Friedenau, Germany, a corporation of Germany Application April 20, 1931, Serial No. 531,487
In Germany May 2, 1930

12 Claims. (Cl. 33—222)

This invention relates to magnetic balances for making vertical and horizontal intensity measurements of the earth's field.

The invention and its aims and objects will be best understood from the following description taken in connection with the accompanying drawings of one embodiment of the invention herein described and shown for illustrative purposes, the true scope of the invention being more particularly pointed out in the appended claims.

Figure 1:
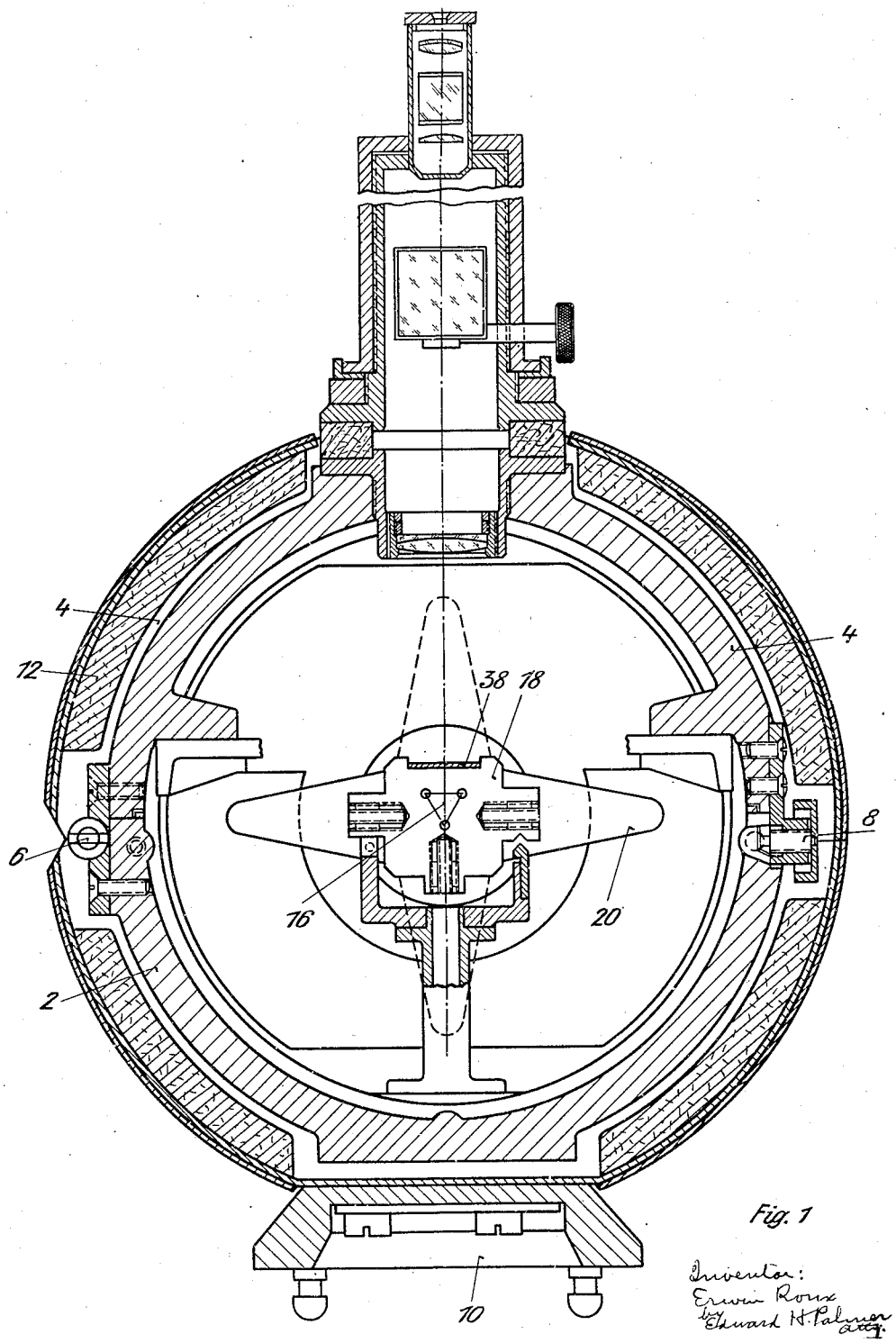
Fig. 1 is a cross section through apparatus of the class described embodying one illustrative form of the invention.

As shown in Fig. 1 the housing for the apparatus may conveniently consist of a generally cylindrical jacket composed of two parts 2 and 4 closed at its front and rear ends by sutiable end plates not shown. The parts 2 and 4 are connected on one side by hinges 6 and can be locked on the other side by a catch 8 so that by releasing the latter and folding back the top part 4, the space between the two end plates is exposed. The lower part 2 of the cylindrical casing may be provided with feet 10 if desired, while the upper part 4 carries a telescope and appurtenant parts which it is unnecessary to describe further herein. The whole case may be surrounded by an insulating jacket 12 of cork or other insulating material covered on the outside by metal plates. The magnetic balance system is provided with the usual knife edge 16 resting upon suitable seats of agate or other material of the required hardness, said seats being carried on the inside faces of said end plates.

The above described housing is that described and claimed in my co-pending application Serial No. 398,667, filed October 10, 1929, now Patent 1,976,636, of October 9, 1934 and is herein given as a convenient housing to be used, but it is to be understood that the present invention is not to be considered as limited to any particular form of housing, as any suitable form of housing may be used within the scope of the invention. If desired reference may be made to said co-pending application for a more detailed description.

Formerly balance systems were made in a single piece but this proved objectionable because it was found that changes in temperature exercised an injurious influence which produced variations in the magnetic force of the magnetic blades and consequently a variation in the position of equilibrium of the balance system, with the result that those variations in the position of equilibrium produced by changes in the intensity of the earth's field and which it was desired to observe, could be distinguished only with difficulty from the above referred to effects produced by variations in temperature. It has therefore been proposed to make the balance or central body portion of the balance system of a different material from that of which the magnetic blades were made, aluminum being generally used for said central body. The steel magnetic blades were then secured to said central body by screws, and it was endeavored so to position and arrange said screws that the shifting of the center of gravity due to variations in temperature would compensate the effects of changes in magnetization due to variations in temperature. It has been found nevertheless that even with this arrangement where said parts of the balance system are composed of different materials, if these materials possess different coefficients of expansion, greater variations in temperature give rise to desultory, uncheckable variations in the position of equilibrium, because the magnetic blades screwed to the central body adhere with a certain amount of force to said central body and said blades therefore generally yield only when the difference between the expansion of the aluminum central body and that of said steel magnetic blades has attained a more or less considerable degree. Where the temperature variations are considerable, temperature errors produced by these uncheckable slippages may render measurements made with magnetic balances absolutely valueless.

One of the objects of the present invention is to overcome these objections.

In accordance with the invention the central body 18 is made of different material from that of which the blades 20 are made, but possessing the same or practically the same coefficient of expansion as the material of said blades 20. Thus the central body may be made of iron, palladium or Monel metal for example which is more easily worked, while the blades may be of hard steel which is better suited to magnets. Both of these possess substantially the same coefficient of expansion. As under these conditions the said balance or central body 18 and said magnetic blades expand to the same extent, injurious slippages cannot occur in spite of the fact that the said magnetic blades and central body are screwed together.

The present invention also contemplates the provision of means to eliminate or neutralize the effect of temperature. Any suitable means may be provided for this purpose, and in the illustrative embodiment of the invention, said means will preferably comprise compensating or balance rods 22, 24 extending from opposite sides of the knife edge 16 forming the fulcrum of the magnetic balance, said rods extending longitudinally of said magnetic blades 20, each of said rods being provided with a weight 26, 28 adjustable longitudinally thereof. Said rods are composed of material having different coefficients of expansion, the construction and arrangement being such that changes in the magnetization of the magnetic blades due to variations in temperature will be compensated by the simultaneously occuring shifting of the center of gravity of the entire balance system. The preliminary adjustment in balanced position may be effected as usual by loosening the blade securing screws 30 and longitudinally adjusting the said blades relative to said central body 18 for which purpose the holes 32 through which said screws pass in said blades are extended somewhat longitudinally of said blades. Fine adjustment can be secured by shifting the weight on one of said balance rods longitudinally of the latter.

Referring to the drawings in the illustrative embodiment of the invention, the magnetic blades 20, 20 are secured by screws 30 to the central body 18 which, in the illustrative embodiment of the invention consist of iron, said screws 30 extending through longitudinally extended slots 32 in said blades and engaging screw threaded holes in said central body. In accordance with the invention said central body will preferably be hollow, so as to save weight. To this end it may, for example, be made of a solid piece subsequently bored, or it may consist of a section of a quadrangular drawn tube or a piece of sheet metal bent to quadrangular shape and suitably welded. The fulcrum of the magnetic balance is formed by the usual knife edge 16 which projects beyond the magnetic plates at opposite sides of the device and rests, as already stated, at its opposite end portions upon fixed seats of agate or other suitably hard material. The compensating or balance rods 22 and 24 extend from opposite sides of the knife-edge 16 and are carried by the central body. The weights 26, 28 are slidable longitudinally of said rods and may be clamped in adjusted position thereon by clamping screws 34, 34. Each of the two rods 22 and 24 has a different coefficient of expansion, the rod 22 for example being of zinc, while the rod 24 is of invar, in the illustrative embodiment of the invention. The fine adjustment of the zero position for the measurement of vertical intensities, that is to say, for example, that of the horizontal mean position of the magnetic axis, may then be effected by sifting or adjusting the weight 28 longitudinally of the invar rod 24, the weight 26 having previously been adjusted in such a position upon the zinc rod 22 that variations in the magnetization of the magnetic blades due to changes in temperature, and variations in the position of equilibrium produced thereby, are compensated by the shifting of the center of gravity of the entire balance system relative to the knife edge 16, produced by the variations in the length of the zinc rod 22. As the magnetic blades are positioned substantially symmetrically relative to the knife edge 16, noticeable shifting of the center of gravity, due to variations in their length in response to changes in temperature, will not occur. It is therefore possible to effect the compensation for temperature practically independently from adjustment of the position of equilibrium. Heretofore, on the other hand, it has practically always been necessary to make a supplementary correction of the adjustment to compensate for temperature changes for the particular locality in which the apparatus was to be used, particularly when the intensity of the earth field at the place where the observations are to be made varied materially from the intensity of the earth field at the locality where the apparatus was made. Owing to the fact that the central body 18 carrying the magnetic blades has the same, or substantially the same coefficient of expansion as that of said magnetic blades themselves, the expansion and contraction of said central body and said magnetic blades will be uniform, so that the injurious slippage cannot occur.

Figure 4:
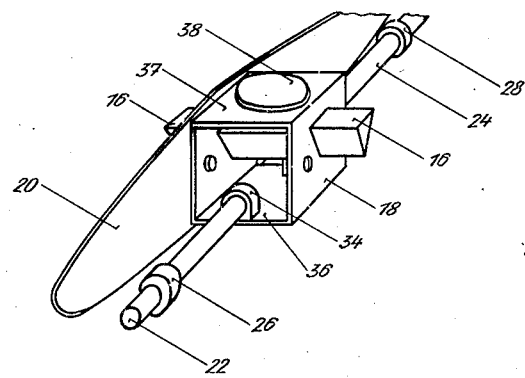
Fig. 4 is a perspective view of a balance system embodying certain features of the invention, one of the magnetic blades being omitted for the sake of clearness.
Figure 5:
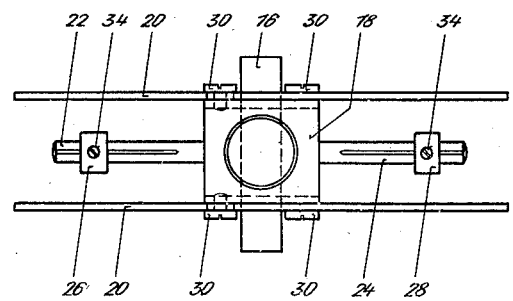
Fig. 5 is a top plan view of the parts represented in Fig. 4.
Figure 2:
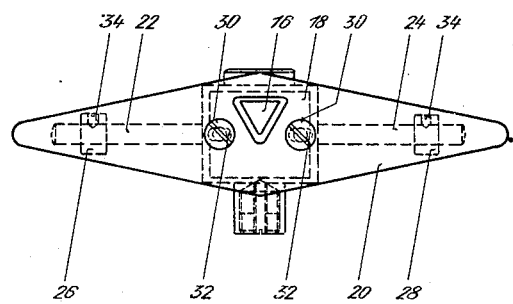
Fig. 2 is a side elevation of a balance system embodying one illustrative form of the invention.
Figure 3:
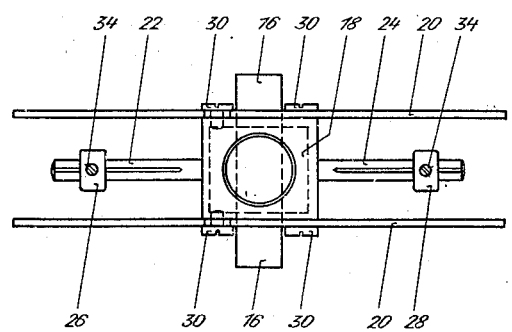
Fig. 3 is a top plan view of the balance system illustrated in Fig. 2.

Referring to Figs. 4 and 5, the lateral walls of the central body which do not carry the magnetic blades are shown as broken away, in fact as entirely missing, so that the central body 18 is entirely open upon said sides, and the compensatory rods 22, 24 are secured to the bottom wall 36 of said central body by brackets 34, 34 for example (only one of which is shown in Fig. 4) preferably within said body. Preferably also the bottom and top walls 36 and 37 will be more or less broken away. By these provisions the mass of said central body is materially reduced, so that the heat content of said central body is reduced to the lowest possible degree. This construction has the advantage that the temperature between the central body and said magnetic blades is equalized much more rapidly. The ambient air thus contacts both with the inner and the outer surfaces of said central body so that throughout the entire magnet balance system a noticeable drop in temperature can hardly occur. Sources of error due to changes in temperature, and which heretofore have made measurements with magnetic balances quite difficult as usually carried out, have thus been eliminated to a very great degree.

Upon the upper side of the balance body 18 there is provided the usual mirror 36.

While herein the invention has been shown in its application to a magnetic balance for measuring vertical intensities, it will be apparent to those skilled in the art that the invention is equally applicable to magnetic balances for measuring horizontal intensities. It will also be apparent that the central or balance body need not be of quadrangular shape as shown in the illustrative embodiment of the invention, but that any other suitable shape can be used.

I am aware that the invention may be embodied in other specific forms than that herein illustrated without departing from the spirit or essential attributes thereof, and I therefore desire the present embodiment to be considered in all respects as illustrative and not restrictive, reference being had to the appended claims rather than to the foregoing description to indicate the scope of the invention.

I claim:
1. A balance system for magnetic balances comprising, in combination, an oscillatory balance body and magnetic blades carried by said body, said balance body and said blades being of different material having substantially the same coefficient of expansion.

2. A balance system for magnetic balances comprising, in combination, an oscillatory balance body and magnetic blades operatively connected thereto, said balance body being of iron and said blades of steel.

3. A balance system for magnetic balances comprising, in combination, an oscillatory balance body and magnetic blades operatively connected thereto, said balance body and blades having substantially the same coefficient of expansion; and rods extending from opposite ends of said balance body upon opposite sides of the balance axis of said balance system, one of said rods upon one side of the balance axis of said balance system being of zinc and another upon the opposite side of the balance axis of said balance system being of invar, each of said rods carrying a weight adjustable longitudinally thereof.

4. A balance system for magnetic balances comprising, in combination, an oscillatory balance body; magnetic blades carried thereby; and rods extending from opposite ends of said balance body upon opposite sides of the balance axis of said balance system, said rods upon opposite sides of the balance axis of said balance system having different coefficients of expansion; and weights carried by said rods upon opposite sides of said balance axis and adjustable toward and from the latter.

5. A balance system for magnetic balances comprising, in combination, a hollow oscillatory balance body and magnetic blades carried thereby, said balance body having broken away walls, to open the interior of said balance body to atmosphere.

6. A balance system for magnetic balances comprising, in combination an oscillatory balance body and magnetic blades, said magnetic blades provided with longitudinal slots and being secured to said balance body by screws extending through said slots and screwed into said balance body, said balance body and blades being of material having substantially the same coefficient of expansion.

7. A balance system, comprising in combination, an oscillatory magnet; supporting means therefor; means, comprising a weight adjustable relative to the axis of oscillation of said magnet, for adjusting said magnet in balanced position upon said supporting means; and means operatively connected to said magnet and responsive to variations in temperature to prevent deviation of said magnet from balanced position due to changes in temperature, said last named means possessing a different coefficient of expansion upon opposite sides of the axis of oscillation of said magnet; and a weight carried by said temperature responsive means and adjustable relatively to said axis of oscillation.

8. A balance system for magnetic balances comprising in combination an oscillatory balance body; supporting means therefor; magnetic blades carried by said balance body; means for compensating temperature changes, said means being operatively connected to said balance body and responsive to temperature changes and possessing a different coefficient of expansion upon opposite sides of the balance axis of said balance system; and means for adjusting said balance body in balanced position upon said supporting means including weights carried by said temperature compensating means upon opposite sides of said balance axis, said weights being relatively adjustable toward and from said balance axis.

9. A balance system for magnetic balances comprising, in combination, a hollow, oscillatory balance body and magnetic blades operatively connected thereto, the interior of said balance body being open to atmosphere.

10. A balance system for magnetic balances comprising, in combination, a hollow, oscillatory balance body and magnetic blades operatively connected thereto, said balance body and said blades being of different material having substantially the same coefficient of expansion, the interior of said balance body being open to atmosphere.

11. A balance system comprising, in combination, an oscillatory magnet; supporting means to support said magnet in balanced position; and means at opposite sides of the axis of oscillation of said magnet and operatively connected to the latter, said means being responsive to variations in temperature and having a different coefficient of expansion upon opposite sides of said axis.

12. A balance system comprising, in combination, an oscillatory magnet; supporting means therefor; means adjustably connecting said magnet to said supporting means to permit preliminary adjustment of said magnet to balanced position upon said supporting means; and means at opposite sides of the axis of oscillation of said magnet and operatively connected to the supporting means, said means being responsive to variations in temperature and having a different coefficient of expansion at opposite sides of said axis.

ERWIN ROUX.